Rice & Hayward,
Rolling Pin,

Nº 29,006. Patented July 3, 1860.

Witnesses:
E. Cohn
S. Hirsch

Inventors:
John James Rice
Geo. W. Hayward
per attorney A. B. Stoughton

UNITED STATES PATENT OFFICE.

FITZ JAMES RICE AND GEORGE W. HAYWARD, OF PROVIDENCE, RHODE ISLAND.

IMPROVEMENT IN ROLLERS FOR PRESSING DOUGH.

Specification forming part of Letters Patent No. 29,006, dated July 3, 1860.

*To all whom it may concern:*

Be it known that we, FITZ JAMES RICE and GEORGE W. HAYWARD, of Providence, in the county of Providence and State of Rhode Island, have invented a new article of manufacture (which we term an "Elastic Hand-Roll") for pressing dough against cutters in the making of confectionery; and we do hereby declare the following to be a full, clear, and exact description of the same, reference being had to the accompanying drawings, making a part of this specification, in which—

Figure 1:
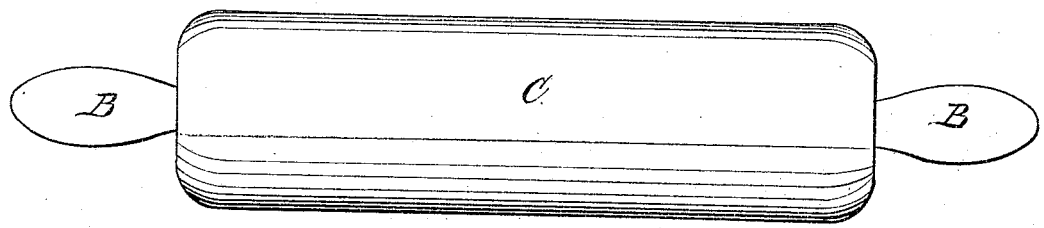
Figure 2:
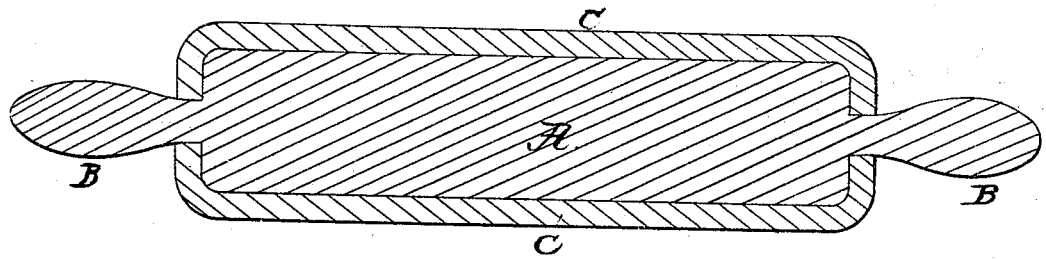

Figure 1 represents a view of one of the rolls. Fig. 2 represents a longitudinal section through the same.

In cutting out confectionery from the dough a cutting-plate is used having in it such shapes or forms as it is desirable to give to the confectionery, this plate being some twenty (or more) inches square and its cutting-edges made of thin strips of metal, against which edges the dough is rolled and cut by a hand-roller. It is found in this business that the ordinary wooden roller heretofore used mars or turns the edges of the cutters, and then from its non-yielding nature it fails to bring down the dough against all the cutting or severing parts of the cutters. The consequence is that the cutters must be frequently repaired or there will be a sticking of the dough or the confectionery will not be of a good shape, either of which is a great drawback and inconvenience and consumes time and material.

We have found that by covering our hand-rolls with vulcanized rubber we not only protect the cutting-edges of the plates and prevent them from being marred or turned down to a very great extent, but when slightly turned the elasticity of the roll will be sufficient to press the dough even against such slightly-depressed surface and sever it into the forms or shapes designed on the cutting-plates, thus making perfect work and preventing the dough or its fragments from clinging to the cutters. This simple elastic covering on the roll we find enables a workman to cut out one-third more material in a day than he could do with a roll having a hard or rigid surface. Gutta-percha, having the compressible properties of india-rubber, may be used for the covering. Leather, cloth, &c., are objectionable because they absorb moisture, stretch and shrink, and the dough will adhere to them. The rubber answers every purpose and is cheap and durable.

The cutting-edges of the plates are generally made of thin brass because of its flexibility, these edges being formed into almost all varieties of shapes or figures, and other metals which would retain their cutting-edges cannot without great expense be bent into these forms, so that taking the soft metal for its pliancy the cutters can be cheaply made, and using the elastic roll on them they will last as long as steel cutters would do with a non-elastic roll.

The nature of our invention consists in a new article of manufacture, which we term an "elastic hand-roll," it being composed of a wooden or any other center (for economy) and covered with vulcanized rubber or gutta-percha, though it may be made entirely of these substances, but at a useless expense, as the core may be of cheaper material and serve an equally good purpose.

To enable others skilled in the art to make and use our invention, we will proceed to describe the same with reference to the drawings.

A represents a core, which may be of wood or any other material, and having handles B B connected with it by which it may be worked. Over this core we put vulcanized rubber or gutta-percha C, which completes the article. The core is more essential as a means of securing the handles by which it is rolled than it is as a basis for the rubber, for the rubber may be solid, or it may be a tube filled with air or some other fluid, and still answer every purpose of rolling the dough against the cutters with sufficient compression to cut it into the desired forms without turning down or bending the cutting-edges, as the rubber will yield so freely to the cutters, while the cutters need not be so sharp as to cut the rubber and still cut the dough. The cost and expense of manufacturing candies by these articles are much reduced. The candies so made are known in the trade as lemon, &c., drops, and are in small squares, diamond, moon, or star shaped, and innumerable other forms, all of which are wrought in the cutters.

Having thus fully described the nature and object of our invention, what we claim as a new article of manufacture is—

A hand-roller covered with vulcanized rubber or gutta-percha and furnished with handles B, for the purpose of rolling dough against cutters in making candies or confectionery, as herein set forth and explained.

FITZ JAMES RICE.
    GEORGE W. HAYWARD.

Witnesses:
 W. P. DOE,
 ROBERT KNIGHT.